United States Patent

Hayashi et al.

[11] Patent Number: 6,040,921
[45] Date of Patent: *Mar. 21, 2000

[54] COMMUNICATION APPARATUS

[75] Inventors: Motohiko Hayashi, Yamatokoriyama; Masahiro Tanaka, Ikoma-gun, both of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,159

[22] Filed: Apr. 11, 1997

[30] Foreign Application Priority Data

Apr. 11, 1996 [JP] Japan .................................. P8-089722

[51] Int. Cl.⁷ ...................................................... H04N 1/00
[52] U.S. Cl. ........................... 358/434; 358/442; 358/438
[58] Field of Search ..................................... 358/433, 434, 358/438, 442; 379/100.15, 100.16, 100.13, 79

[56] References Cited

U.S. PATENT DOCUMENTS

| | | | |
|---|---|---|---|
| 5,153,912 | 10/1992 | Sakakibara et al. | |
| 5,226,074 | 7/1993 | Han . | |
| 5,544,234 | 8/1996 | Terajima et al. | 379/100.16 |
| 5,748,715 | 5/1998 | Shinagawa et al. | 379/100.13 |
| 5,793,844 | 8/1998 | Matsuda | 379/79 |

FOREIGN PATENT DOCUMENTS

| | | |
|---|---|---|
| 2 643 207 | 8/1990 | France . |
| 63-38367 | 2/1988 | Japan . |
| 64-44674 | 2/1989 | Japan . |

*Primary Examiner*—Amelia Au
*Assistant Examiner*—Vikkram Bali

[57] ABSTRACT

A communication apparatus performs a maintenance operation in a short period of time, without using a communication apparatus which includes a special communication protocol on a maintenance side. In a facsimile machine 24, upon receipt of a DTMF signal on a communication line 1, the DTMF signal is supplied to a modem 8 through a relay 3 and a transformer T1. This is done such that the modem 8 converts the received DTMF signal into a code signal such as 1 to 0, * and # and supplies the code signal to a CPU 16 through a data bus, formed by a gate array 11 and a main gate array 23. The CPU 16 stores the code in a temporary storage RAM 19, digit by digit. In the meantime, when it is determined that the code signal is "96#," from a RAM 17, the CPU 16 reads a functional parameter associated with the number of a soft switch which is temporarily stored in the RAM 19. Among data regarding the soft switch, the CPU 16 changes data which are associated with a data number which is temporarily stored in the RAM 19 into a changed value which is also temporarily stored in the RAM 19 and writes the changed value in the RAM 17 again.

16 Claims, 8 Drawing Sheets

| SW NO. | DATA NO. | ITEM | SETTING/FUNCTION OF SOFT SW | | INITIAL SETTING |
|---|---|---|---|---|---|
| | | | 1 | 0 | |
| ...... | ...... | ...... | ...... | ...... | ...... |
| | 1 | SELF MODE FUNCTION | NOT AVAILABLE | AVAILABLE | 0 |
| | 2 | CNG DETECTED | 3 TIMES | 2 TIMES | 0 |
| | 3 | CUTTER FUNCTION | NOT AVAILABLE | AVAILABLE | 0 |
| | 4 | INTERVAL BETWEEN CED/NSF SIGNALS | 500ms | 75ms | 0 |
| SW 7 | 5 | SIGNAL SENDING LEVEL | BINARY -8, -4, -2, -1 dB NO. 5, 6, 7, 8 INITIAL SETTING (-8dB) X 1 + (-4dB) X 0 + (-2dB) X 1 + (-1dB) X 0 = -10dB | | 1 |
| | 6 | | | | 0 |
| | 7 | | | | 1 |
| | 8 | | | | 0 |
| ...... | | | | | |

COMMUNICATION APPARATUS

BACKGROUND OF THE INVENTION

1. Field of the Invention

The present invention relates to a communication apparatus such as a telephone machine and a facsimile machine.

2. Description of the Related Art

As described in Japanese Unexamined Patent Publication JP-A 63-38367, conventional communication apparatuses, such as a telephone machine and a facsimile machine, include a facsimile machine maintained under the control of a personal computer in such a manner that owing to a diagnosis function of the facsimile machine for sending a memory content of a control information storage area of a microprocessor of the facsimile machine, in response to a request for self-diagnosis which is received from the personal computer through a communication line, without converting the memory content into an image signal, the personal computer can convey an accident or the like to the facsimile machine located far away from the personal computer. Alternatively, as described in Japanese Unexamined Patent Publication JP-A 64-44674, conventional communication apparatuses include a remote facsimile machine which has a function to respond to a remote signal sent from a facsimile machine, and a function of reading data from a memory or changing data stored in the memory in response to an instruction signal for remote data reading or remote data changing which is sent from the facsimile machine. Accordingly, the facsimile machine can learn about data and the like such as a contrast adjustment value of the remote facsimile machine located in a remote place, data concerning density adjustment of a printer or a scanner, data which determine the validity/invalidity of various facsimile functions of facsimile machine. Thus, such data can be changed through a remote operation by means of the facsimile machine.

However, with a communication apparatus according to the conventional techniques, at a center which controls a communication apparatus such as a facsimile machine and a remote facsimile machine, since it is necessary to use a unique communication protocol which is required by a personal computer, a facsimile machine or the like which is equipped with a fax modem for the purpose of controlling the communication apparatus, there is a restriction on an apparatus which is used for controlling the communication apparatus. Therefore, even when a condition of the communication apparatus at only one point is to be found, training must be conducted repeatedly, which demands a long time and a high communication cost.

SUMMARY OF THE INVENTION

Accordingly, an object or the invention is to provide a communication apparatus capable of performing control in a short period of time without any unique communication protocol.

To achieve the object above, a first aspect of the invention relates to a communication apparatus for data communication based on predetermined various parameter values for communication, the communication apparatus comprising:

detecting means for detecting a dual tone modulation frequency signal received through a communication line, the dual tone modulation frequency signal including at least various parameter values; and controlling means for changing settings of the predetermined various parameter values for communication in accordance with a detection result obtained by the detecting means.

According to a second aspect of the invention, the communication apparatus further comprises storing means for storing a predetermined secret identification number is and when a secret identification number, included in a dual tone modulation frequency signal which is detected by the detecting means matches a secret identification number stored in the storing means, the controlling means changes the settings of the predetermined various parameter values for communication in accordance with the detection result obtained by the detecting means.

According to a third aspect of the invention, the communication apparatus further comprises operating means for allowing entry of the secret identification number, and when entry of a secret identification number is allowed by the operating means, the controlling means judges whether a secret identification number included in a dual tone modulation frequency signal which is detected by the detecting means matches a secret identification number stored in the storing means or not.

According to a fourth aspect of the invention, the communication apparatus further comprises voice guidance sending means for sending a voice guidance which expresses an operation sequence, to the communication line in the operation of changing the settings of the predetermined various parameter values for communication or judging the secret identification number by the controlling means.

A fifth aspect of the invention relates to a communication apparatus for data communication based on predetermined various parameter values for communication, the communication apparatus comprising:

converting means for converting the predetermined various parameter values for communication into voice signals;

detecting means for detecting a dual tone modulation frequency signal received through a communication line, the dual tone modulation frequency signal including data demanding to send the predetermined various parameter values for communication; and controlling means for controlling the converting means in accordance with a detection result obtained by the detecting means to convert the predetermined various parameter values for communication into the voice signals and send to the communication line.

Hence, according to the first aspect of the invention, when the detecting means detects the dual tone modulation frequency signal which Is received through the communication line, the controlling means changes the setting of the predetermined various parameter values for communication which are used for data communication, in accordance with the detection result which is obtained by the detecting means. Thus, an apparatus, such as a telephone machine, which is connected to the communication apparatus through the communication line and which is capable of sending the dual tone modulation frequency signal can change the predetermined various parameter values for the communication apparatus.

According to the second aspect of the invention, when the detecting means detects the dual tone modulation frequency signal which is received through the communication line and the controlling means judges that a secret identification number, which is included in the detected dual tone modulation frequency signal, coincides with a secret identification number which is stored in the storing means, in accordance with the dual tone modulation frequency signal which is subsequently detected by the detecting means, the controlling means changes the setting of the predetermined various parameter values for communication which are used for data communication. Thus an apparatus, such as a telephone machine, which is connected to the communication apparatus through the communication line and which is capable of sending the dual tone modulation frequency signal can change the predetermined various parameter values for the communication apparatus.

According to the third aspect of the invention, after the operating means allows entry of a secret identification number, when the detecting means detects the dual tone modulation frequency signal which is received through the communication line, the controlling means judges whether a secret identification number, which is included in the detected dual tone modulation frequency signal, matches with a secret identification number which is stored in the storing means. Further, the controlling means judges the secret identification numbers to match with the secret identification number, in accordance with the dual tone modulation frequency signal which is subsequently detected by the detecting means, the controlling means changes the setting of the predetermined various parameter values for communication which are used for data communication. Accordingly an apparatus, such as a telephone machine, which is connected to the communication apparatus through the communication line and which is capable of sending the dual tone modulation frequency signal, can change the predetermined various parameter values for the communication apparatus.

According to the fourth aspect of the invention, when the detecting means detects the dual tone modulation frequency signal which is received through the communication line, the controlling means changes the setting of the predetermined various parameter values for communication which are used for data communication in accordance with the detection result which is obtained by the detecting means, whereas concurrently the voice guidance sending means sends a voice guidance which expresses an operation sequence to the communication line while the controlling means changes the setting of the predetermined various parameter values for communication or judges the secret identification numbers. Therefore, an apparatus, such as a telephone machine, which is connected to the communication apparatus through the communication line and which is capable of sending the dual tone modulation frequency signal can change the predetermined various parameter values for the communication apparatus and confirm an operation of changing the various parameter values by means of a voice.

According to the fifth aspect of the invention, when the detecting means detects the dual tone modulation frequency signal which is received through the communication line, in accordance with the detection result which Is obtained by the detecting means, under the control of the controlling means, the converting means converts each parameter value into a voice signal and sends the voice signal Into the communication line. Thus, an apparatus, such as a telephone machine, which is connected to the communication apparatus through the communication line and which is capable of sending the dual tone modulation frequency signal can confirm the various parameter values for the communication apparatus by means of a voice.

As described above, in the invention according to the first aspect, since a communication apparatus, such as a telephone machine, which is capable of sending the dual tone modulation frequency signal can change predetermined various parameter values for communication which are used in a facsimile machine for data communication, without using a communication apparatus which includes a special communication protocol on a maintenance side but by means of a simple operation, it Is possible to maintain and control the facsimile machine on the maintenance side.

In the invention according to the second aspect, when a secret identification number which is formed by the detected dual tone modulation frequency signal matches with a secret identification number which is set in advance, the setting of the predetermined various parameter values for communication which are set for the facsimile machine can be changed in accordance with the dual tone modulation frequency signal which is subsequently received. Therefore, it is possible to prevent a third person from inadvertently changing the predetermined various parameter values for communication.

In the invention according to the third aspect, since entry of a secret identification number is allowed on the maintenance side only when entry of the secret identification number is allowed by a user, the user can set to allow or prohibit maintenance but excessive service by the maintenance side is prevented.

In the invention according to the fourth aspect, when a communication apparatus, such as a telephone machine, which is capable of sending the dual tone modulation frequency signal changes predetermined various parameter values for communication which are used in a facsimile machine for data communication, since operation procedures for this are sequentially sent as a voice guidance, it is possible to maintain and control the facsimile machine without any doubt on the maintenance side.

In the invention according to the fifth aspect, since predetermined various parameter values for communication which are used in a facsimile machine for data communication can be sent as a voice, without using a communication apparatus which includes a special communication protocol on a maintenance side but by means of a simple operation, it is possible to confirm a condition of the facsimile machine on the maintenance side.

BRIEF DESCRIPTION OF THE DRAWINGS

Other features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
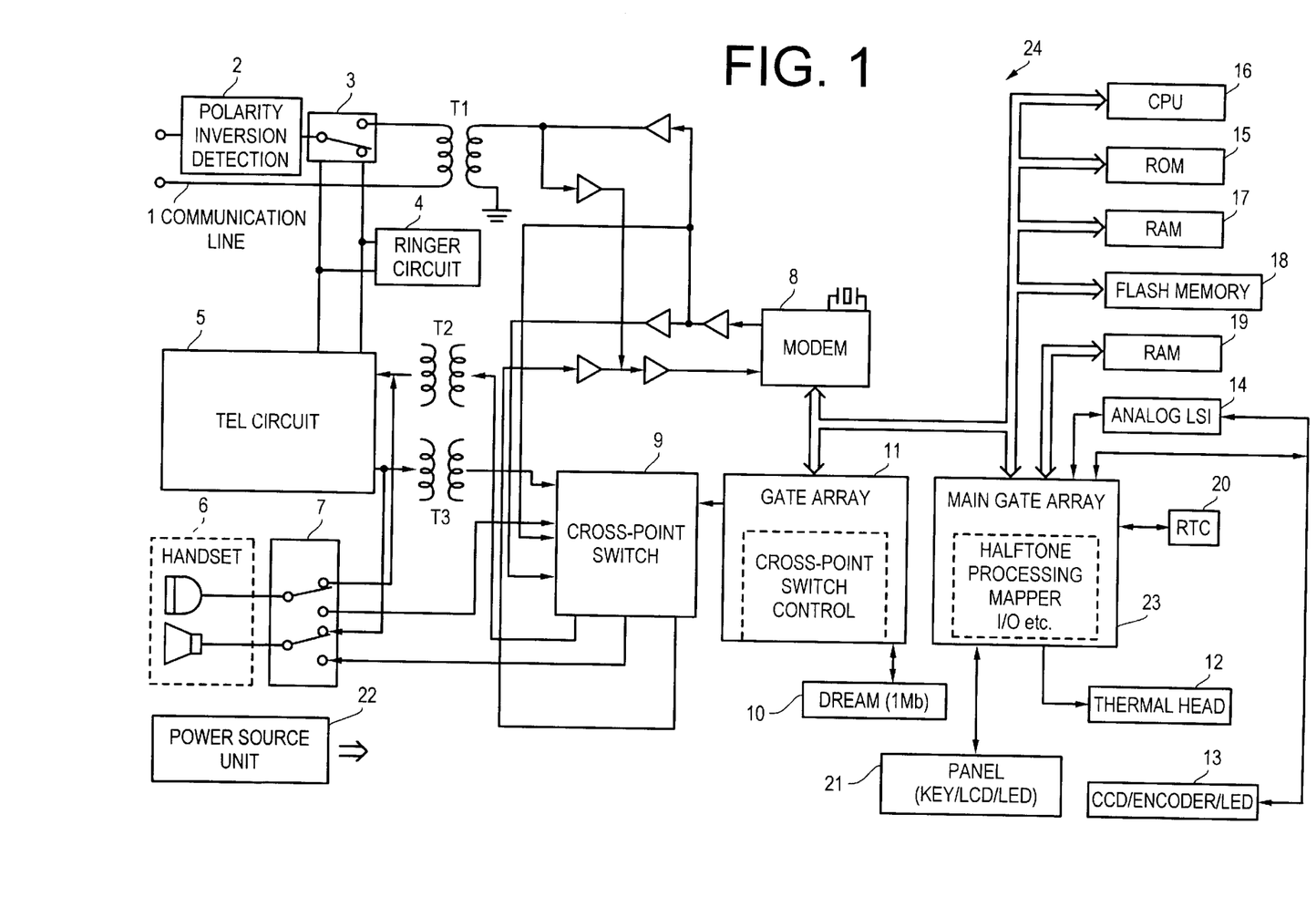
FIG. 1 is a functional block diagram showing an electrical structure of a facsimile machine 24 which is a communication apparatus according to a first preferred embodiment of the invention.
Figure 2:
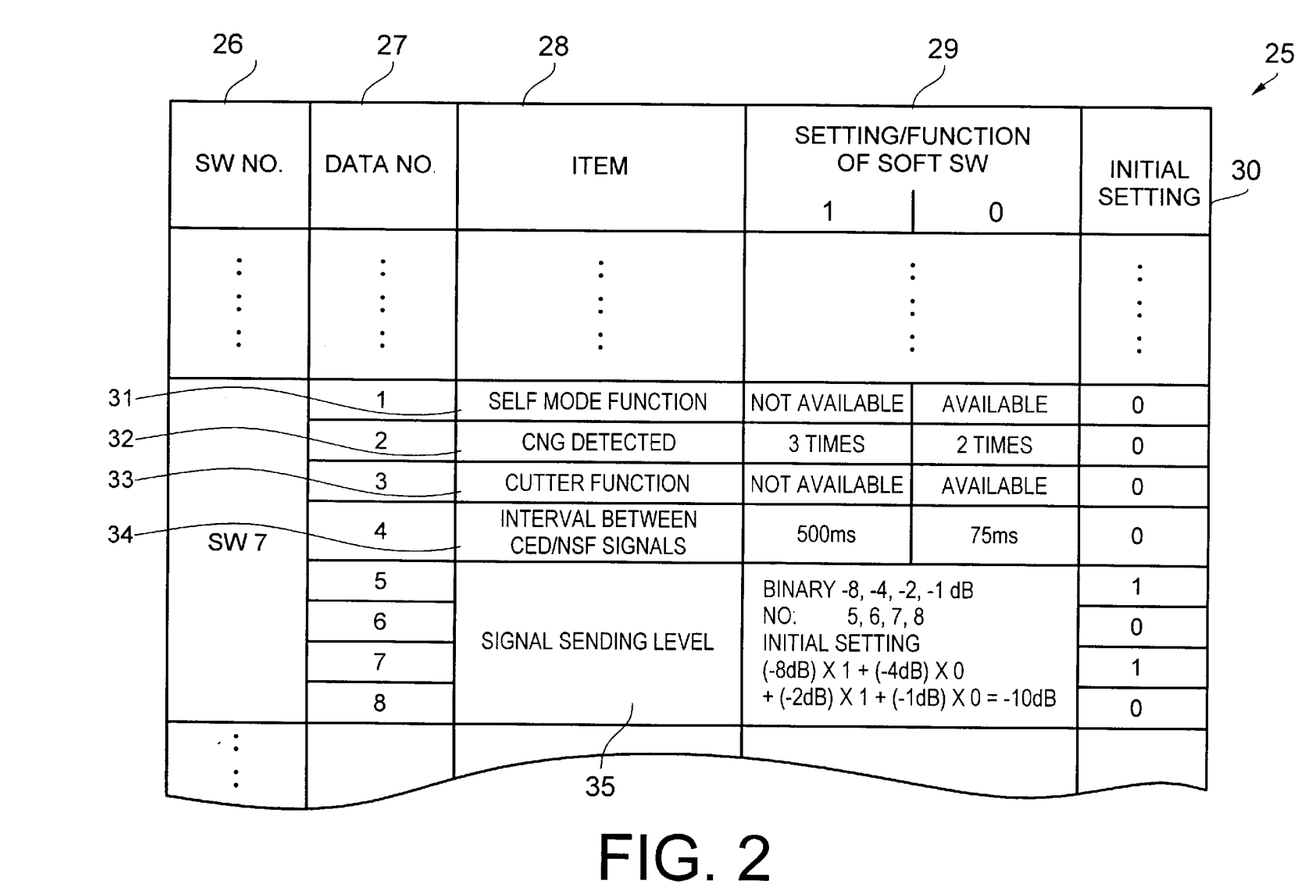
FIG. 2 is a view of a functional parameter chart 25 which shows various parameter values which are used in the facsimile machine 24.
Figure 3A:
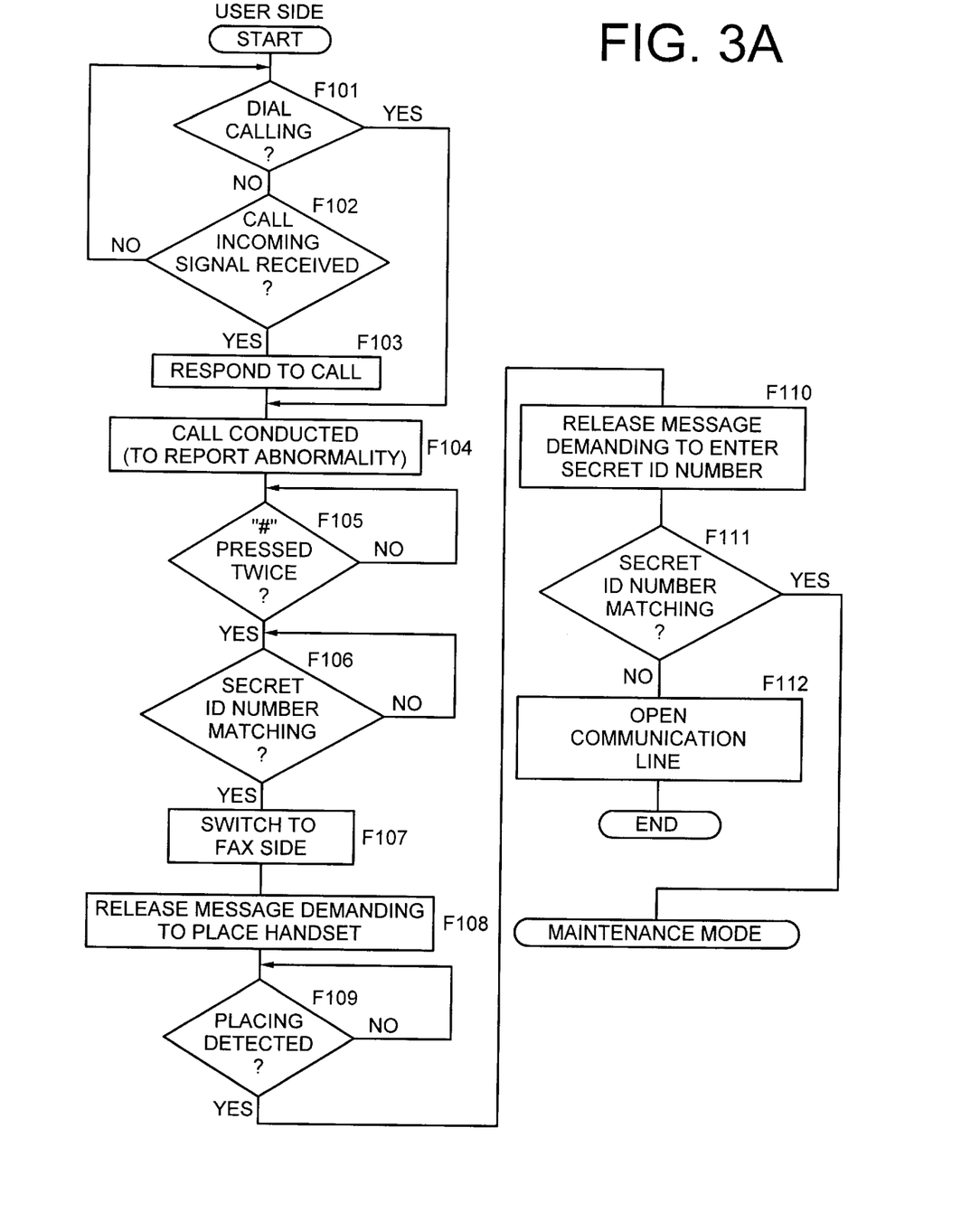
FIG. 3A is a flow chart showing a manner in which the facsimile machine 24 is controlled at the beginning of a maintenance operation.
Figure 3B:
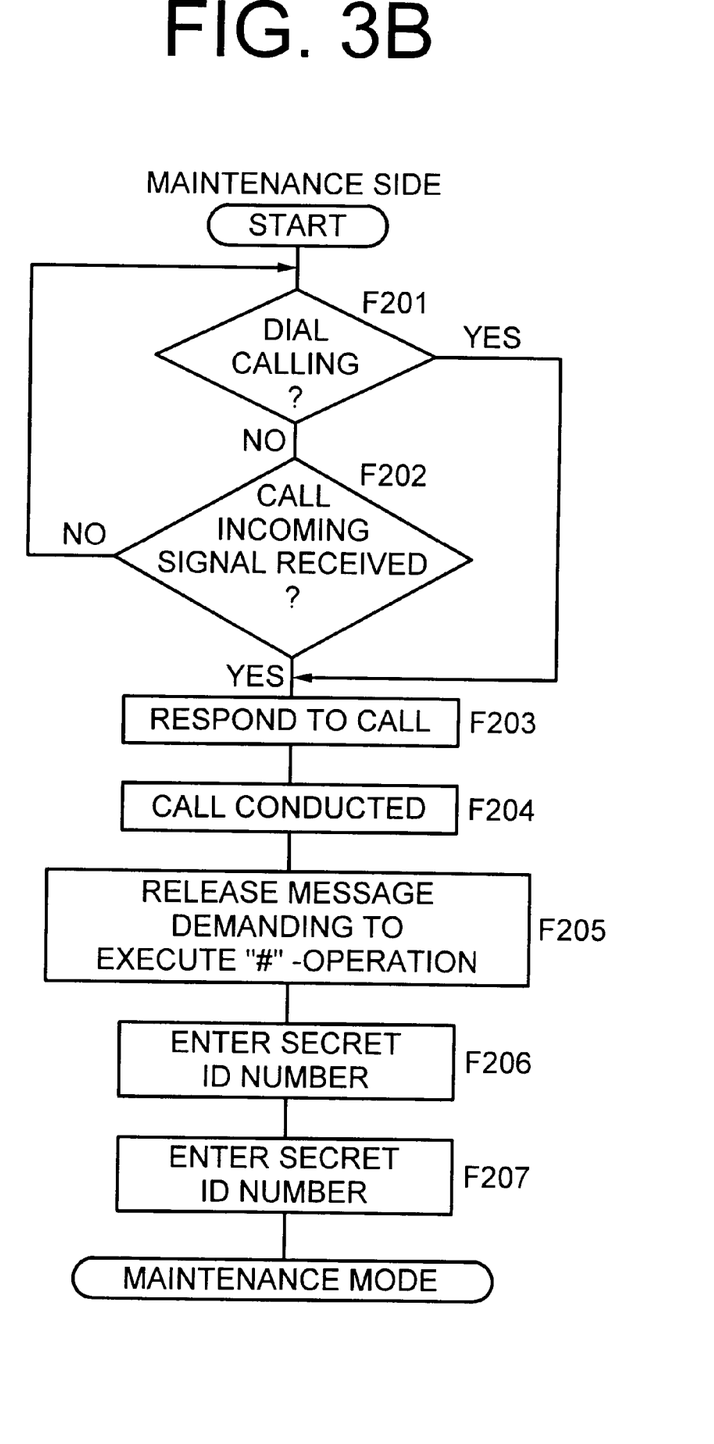
FIG. 3B is a flow chart showing an operation at the beginning of a maintenance operation by a maintenance side communication apparatus 40.
Figure 4A:
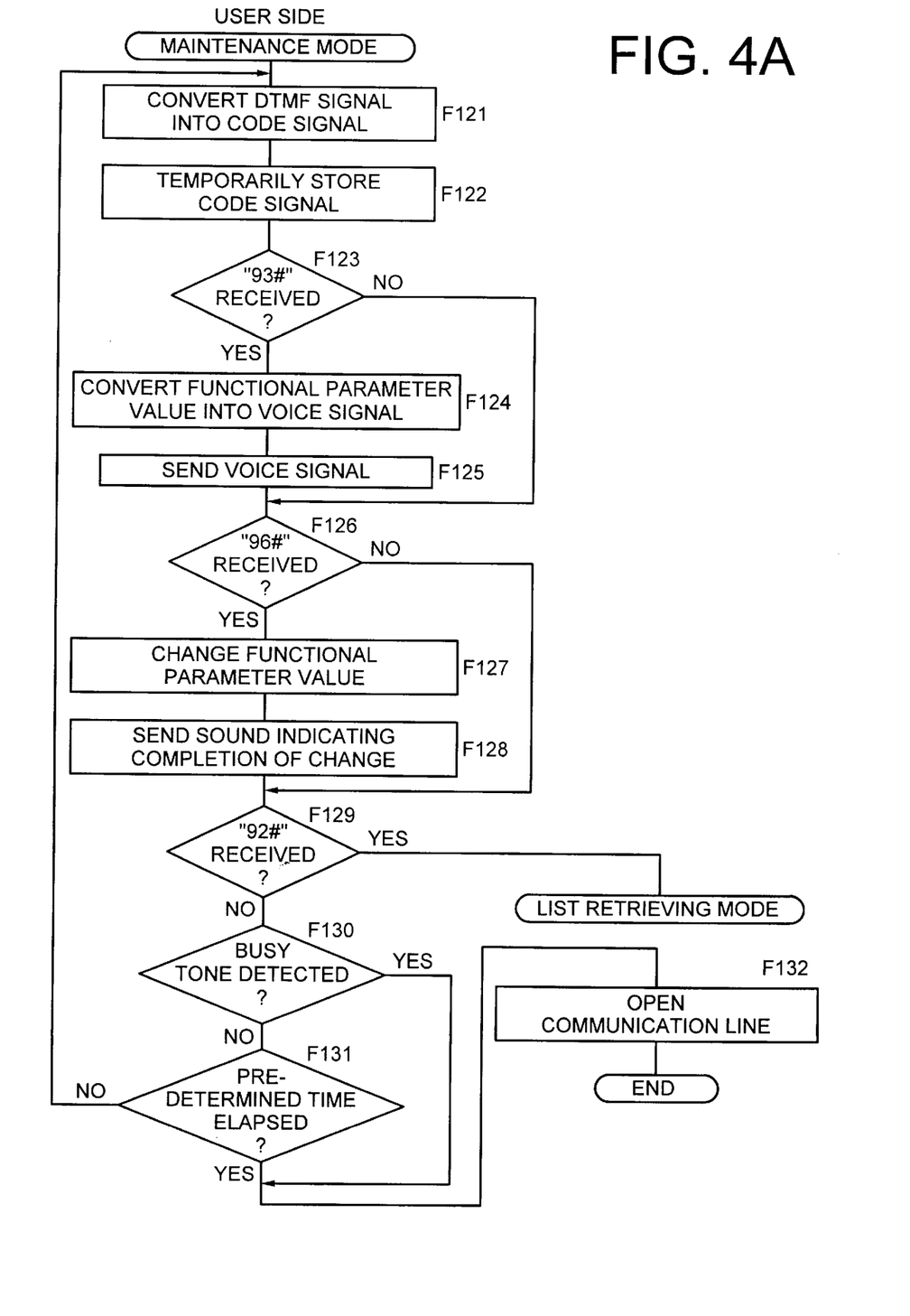
FIG. 4A is a flow chart showing a manner in which the facsimile machine 24 is controlled in a maintenance mode.
Figure 4B:
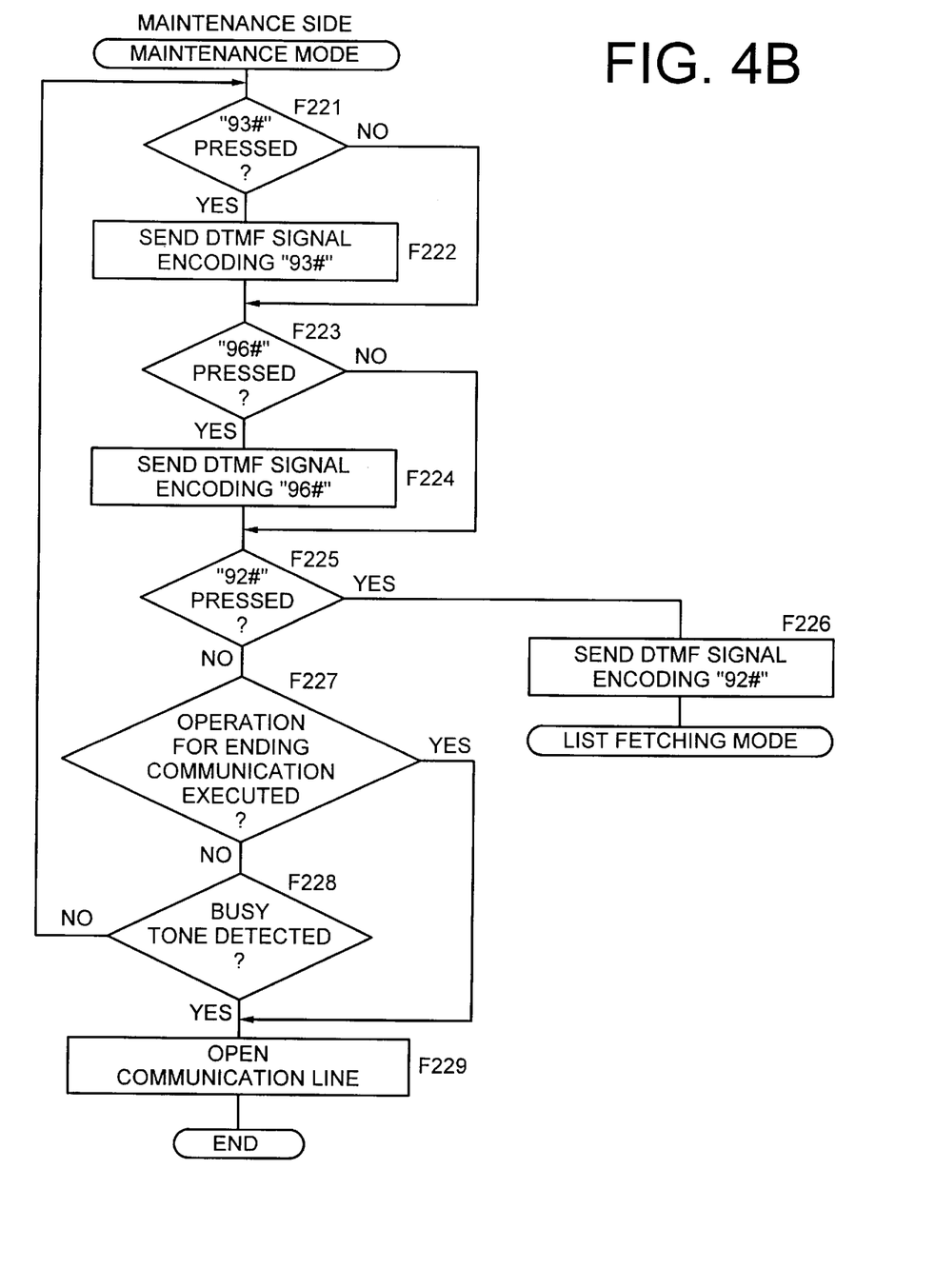
FIG. 4B is a flow chart showing an operation of the maintenance side communication apparatus 40 in the maintenance mode.
Figure 5A:
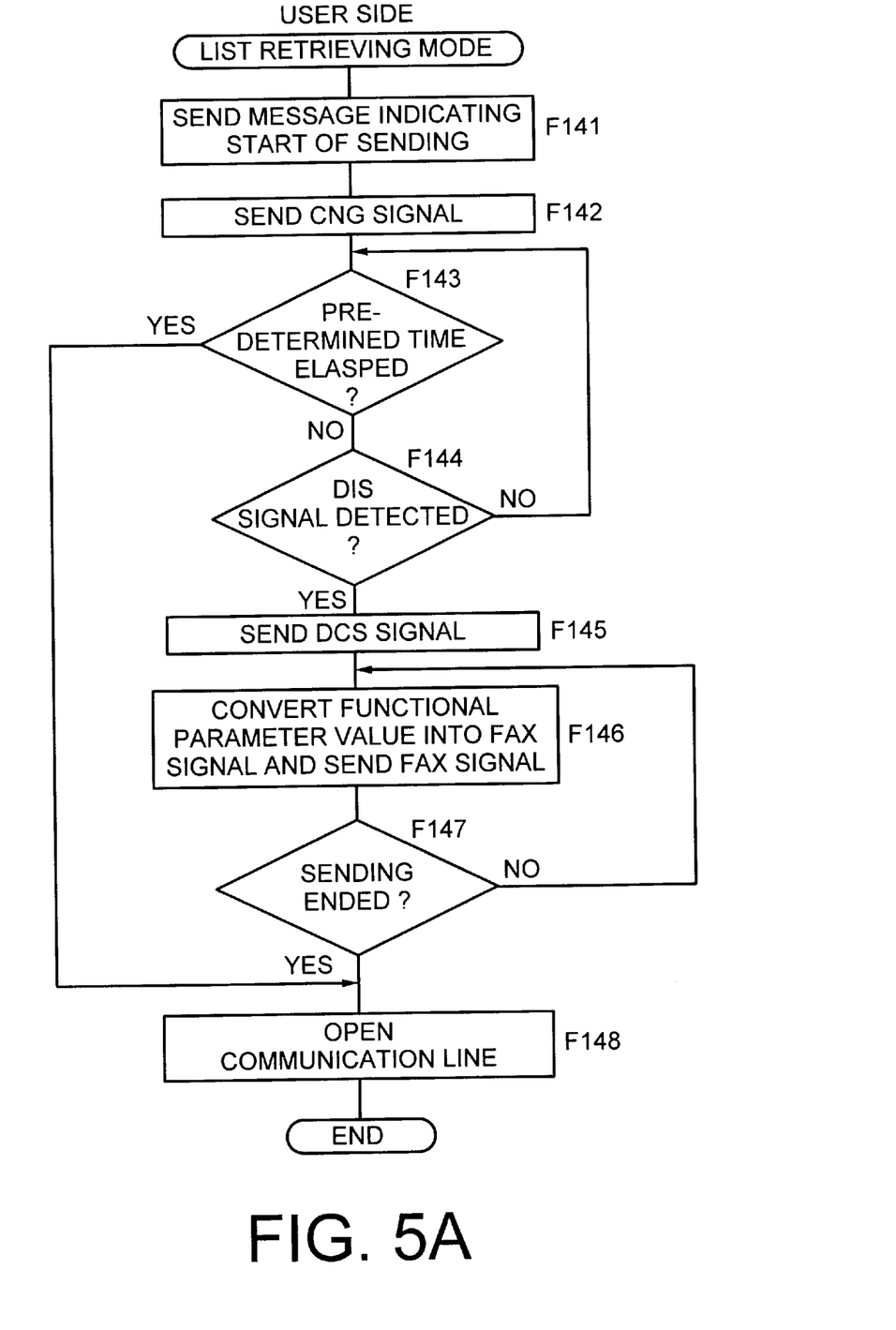
FIG. 5A is a flow chart showing a manner in which the facsimile machine 24 is controlled during a list fetching operation.
Figure 5B:
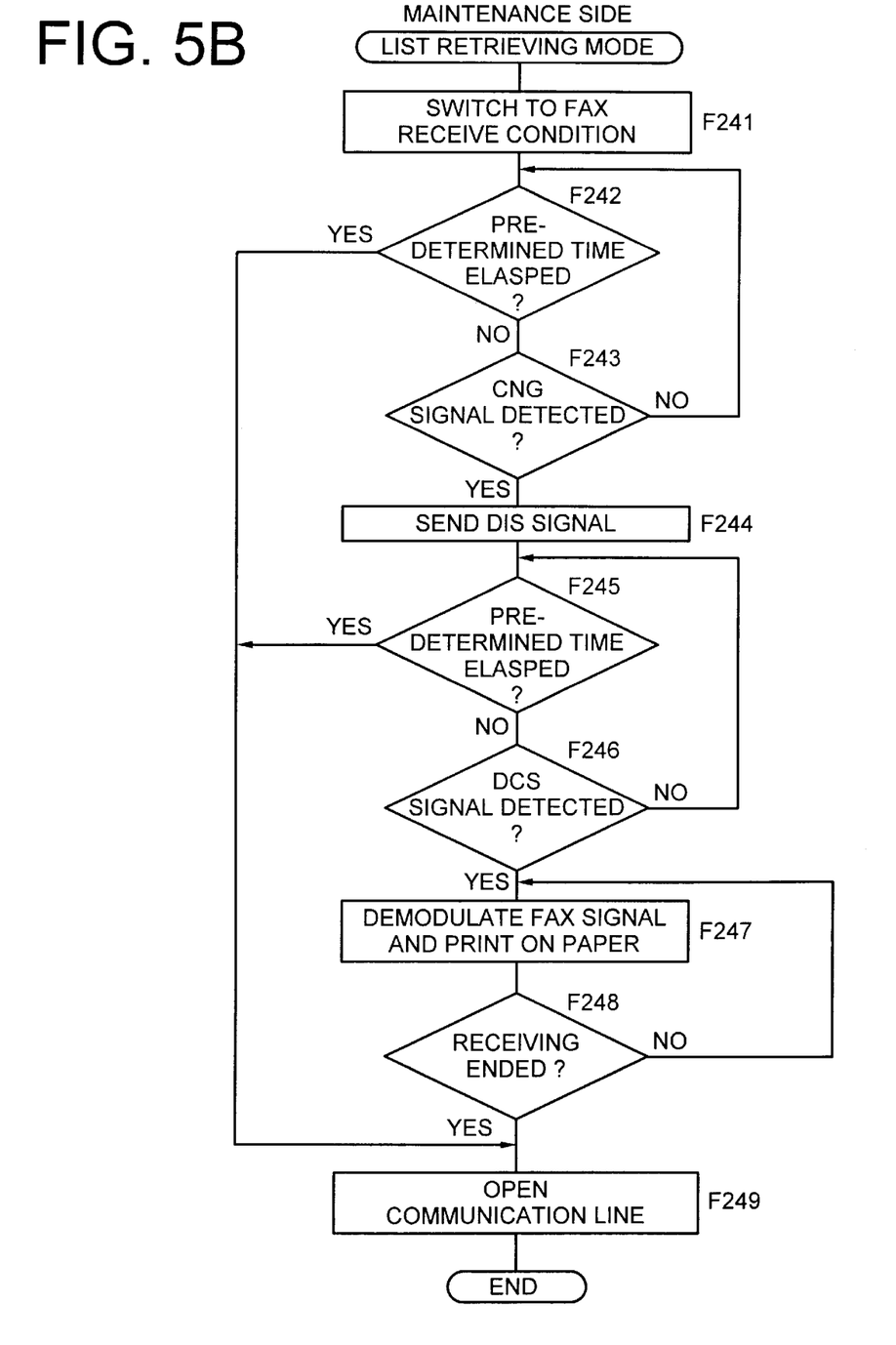
FIG. 5B is a flow chart showing an operation of the maintenance side communication apparatus 40 during the list fetching operation.

FIG. 1 is a functional block diagram showing an electrical structure of a facsimile machine 24 which is a communication apparatus according to a first preferred embodiment of the invention. FIG. 2 is a view of a functional parameter chart 25 which shows various parameter values which are used in the facsimile machine 24. FIG. 3A is a flow chart showing a manner in which the facsimile machine 24 is controlled at the beginning of a maintenance operation where the facsimile machine 24 is regarded as a user side. FIG. 3B is a flow chart showing an operation of a maintenance side communication apparatus 40 at the be ginning of a maintenance operation. FIG. 4A is a flow chart showing a manner in which the facsimile machine 24 is controlled in a maintenance mode. FIG. 4B is a flow chart showing an operation of the maintenance side communication apparatus 40 side in the maintenance mode. FIG. 5A is a flow chart showing a manner in which the facsimile machine 24 is controlled during a list fetching operation, and FIG. 5B is a flow chart showing an operation of the maintenance side communication apparatus 40 during the list fetching operation.

In FIG. 1, reference numeral 1 denotes a communication line which is connected to the maintenance side communication apparatus 40 through a telephone switch or switchboard not shown. Reference numeral 2 denotes a polarity inversion detecting part which detects inversion of the polarity of the communication line 1. Reference numeral 3 denotes a relay which switches paths from the communication line 1 for a blackout state and an energizing state. Reference numeral 4 denotes a ringer circuit which creates a calling tone in response to a calling signal which is received from the telephone switchboard which is connected to the communication line 1. Reference numeral 5 denotes a TEL circuit which forms a communication path to the communication apparatus 40 which is connected through the communication line 1. Reference numeral 6 denotes a handset, which is formed by a microphone and a speaker, for communication with the communication apparatus 40 on the communication path which is formed by the TEL circuit 5. Denoted at 7 is a relay which connects the handset 6 to either one of the TEL circuit 5 and a cross-point switch circuit 9 which will be described later.

Denoted at 8 is a modem which demodulates image data which are received on the communication line 1 and modulates image data which are to be sent to the communication line 1. The modem 8 has a DSP recording/reproducing function of generating voice data which are to be stored in a flash memory 18 which will be described later and synthesizing the voice data which are stored In the flash memory 18. Denoted at 9 is a cross-point switch circuit which optionally supply a signal which is to be sent to the communication line 1, a signal from the TEL circuit 5, a signal from the handset 6, a signal from the modem 8 respectively to the TEL circuit 5, the handset 6 or the modem 8. Denoted at 10 is a DRAM (Dynamic Random Access Memory) which is used to compress or expand image data which are sent or received by the modem 8 for facsimile transmission. Denoted at 11 is a gate array circuit which controls switching of the cross-point switch circuit 9, writing into or reading front the DRAM 10, etc.

Denoted at 12 is a thermal head which prints image data which are compressed or expanded by the DRAM 10, after being demodulated by the modem 8, onto a recording paper such as a thermosensitive paper. Denoted at 13 is an image reading apparatus which is formed by a CCD (Charge Coupled Device), an encoder, an LED (Light Emitting Diode) and the like to read an image from an original. Denoted at 14 is an analog LSI (Large Scale Integrated circuit) which drives and controls the Image reading apparatus 13 in accordance with data which are read from the image reading apparatus 13 while sending the data which are read by the image reading apparatus 13 to the DRAM 10 or the modem 8.

Denoted at 15 is a ROM (Read Only Memory) which stores a program which is necessary for controlling various operations of a main unit of the facsimile machine, a voice guidance expressing an operation of setting various parameter values or an operation method of judging the secret identification numbers, etc. Denoted at 16 is a CPU (Central Processing Unit) which controls various operations of the main unit of the facsimile machine in accordance with the program which is stored in the ROM 15. Denoted at 17 is a RAM which requires a back-up and stores registration data such as a telephone number of the facsimile machine and a telephone number of a partner machine, data which express a condition of the apparatus, and secret identification number data. As the data which express a condition of the apparatus, as shown in the functional parameter chart 25 in FIG. 2, data such as decisions determining whether the apparatus has various functions, detection rates of detecting various signals and values of signal sending levels are set by soft switches SW and stored as functional parameters.

Denoted at 18 is a flash memory which requires a backup and stores voice data which are created by the modem 8. Denoted at 19 is a temporary storage RAM which temporarily stores data. Denoted at 20 is a timekeeper IC (RTC) which measures time. Denoted at 21 is a panel control part which controls keys for instructing to enter of a telephone number and the like, to shift to an answering machine mode and to start facsimile transmission, an LCD (Liquid Crystal Display) which displays telephone numbers and the like, and an LED which reports a facsimile transmission mode such as a standard mode, a fine mode and halftone mode. Denoted at 22 is a power source unit which supplies electric power to the main unit of the facsimile machine.

Denoted at 23 is a main gate array circuit which appropriately wires up the modem 8, the gate array circuit 11, the ROM 15, the CPU 16, the RAM 17, the flash memory 18 and the RAM 19 and performs various controlling such as controlling of the image reading apparatus 13, controlling of the analog LSI 14, reading of a time which is measured by the timekeeper IC 20, entry through the keys on the panel control part 21, displaying of characters on the panel control part 21, controlling of turning on or off of the LED on the panel control part 21.

Technical communication parameters are defined by the illustrative examples of facsimile signaling protocol and attributes labeled item 28 in FIG. 2. Accordingly, the technical communications parameters or functional parameters may include a self-mode function, a calling tone signal (CNG), a cutter function, a time interval between a called station identification signal (CED), a non-standard facilities signal (NSF), a sending signaling level, or other facsimile signaling information. CNG, NSF, and CEG, are facsimile signaling terms that are well known and have been described in various publications (e.g., CCITT (Committee Consultative International Telephone and Telegraph) G3 standard publication).

Specifically referring to FIG. 2, in the functional parameter chart 25, settings and functions 29 of various items 28

(technical communications parameters) for data numbers 27 corresponding to soft switch numbers 26 are stored in initial setting columns 30. For example, data numbers 27 of first to eighth data correspond to the seventh soft switch SW7. The item 28 for the first data is allotted to a self mode function 31, the item 28 for the second data is allotted to a detection number 32 of detecting CNGs (Calling tone). the item 28 for the third data is allotted to a cutter function 33, the item 28 for the fourth data is allotted to an interval 34 between a CED (Called Station Identification) signal and an NSF (Non-Standard Facilities) signal, and the items 28 for the fifth to eighth data are allotted to a signal sending level 35. Setting/functions 29 includes data expressing whether there is a self mode function provided, data expressing whether the detection number of detecting CNGs is three or two, data expressing whether there is a cutter function provided, data expressing whether the interval between the CED signal and the NSF signal is 500 ms or 75 ms, and data expressing the signal sending level, and initial set values of such data are stored, as "00001010" for instance, in the initial setting columns 30.

With respect to the facsimile machine 24 which has such a structure as described above, an operation at the beginning of maintenance will be described.

First, an operation of the user side facsimile machine 24 will be described, with reference to FIG. 3A. At step F101, whether there is a dial calling is judged. At step F102 which follows when it is judged that there is not a dial calling, whether a call incoming signal is received is judged. If it is judged that a call incoming signal is not received, the sequence returns to step F101. At step F103 which follows when it is judged that a call incoming signal is received, for servicing a call, an operation responding to the call incoming signal is carried out. At step F104 responding to the call incoming signal, or which follows when it is judged at step F101 that there is a dial calling, communication is established in which the user side facsimile machine 24 communicates with the maintenance side communication apparatus 40. At this stage, the facsimile machine 24 detects an abnormal condition which disables communication, for instance, and reports the abnormal condition to the maintenance side communication apparatus 40.

At step F105, whether a predetermined operation, such as pressing of a Sharp key (#) twice, Is executed in response to an instruction from the maintenance side communication apparatus 40 is judged. At step F106 which follows when it is judged that such an operation is carried out, In order to confirm that the predetermined operation is carried out, whether secret identification numbers match with each other is judged. One of the secret identification numbers is a secret identification number which is formed by a dual tone modulation frequency signal (hereinafter referred to as DTMF signal) which is received from the maintenance side communication apparatus 40, while the other one of the secret identification numbers is a secret identification number which is stored in advance in the RAM 17 of the facsimile machine 24. At step F107 which follows when it is judged that the secret identification numbers match with each other, communication is switched to the facsimile side. At step F108, a predetermined message is outputted. The message is one which demands an operator on the facsimile machine 24 side to place the handset at a predetermined position.

At step F109, whether placing of the handset is detected is judged. At step F110 which follows when it is judged that placing of the handset is detected, a message which demands entry of a secret identification number for shifting to a maintenance mode is sent toward the maintenance side communication apparatus 40. At step F111, whether the secret identification number in the form of the DTMF signal from the maintenance side communication apparatus 40 matches with the secret Identification number which is stored in advance in the ROM 15 of the facsimile machine 24 is judged. If it is judged that there is a match, the maintenance mode is invoked and the operation is ended. At step F112 which follows when it is judged that there is not a match, the communication line is opened and the operation is ended.

Next, an operation of the maintenance side communication apparatus 40 will be described, with reference to FIG. 3B. At step F201, whether there is a dial calling is judged. At step F202 which follows when it is judged that there is not a dial calling, whether a call incoming signal is received is judged. If it is judged that a call incoming signal is not received, the sequence returns to step F201. At step F203 which follows when it is judged that a call incoming signal is received or when it is judged at the precedent step F201 that there is a dial calling, a responding operation is executed for a call. At step F204, communication is established In which the maintenance side communication apparatus 40 communicates with the user side facsimile machine 24.

At this stage, when an abnormal condition is reported from the facsimile machine 24, at step F205, a message is sent which demands the facsimile machine 24 to execute a predetermined operation such as pressing of a Sharp key (#) twice. At step F206, a secret identification number for confirming whether the predetermined operation has been carried out is entered and sent. At step F207, in responding to the message demanding entry of the secret identification number sent from the facsimile machine 24 for shifting to the maintenance mode, the secret identification number is entered and sent, so that the maintenance mode is invoked and the operation is ended.

In other words, when a user senses that there is an abnormality with the facsimile machine 24, such as the incapability of sending or receiving a fax, and calls the maintenance side which is in charge of the facsimile machine 24 (step F101) and the maintenance side answers the call (steps F202 to F203), or when the maintenance side calls to find whether there is an abnormality or the like with the facsimile machine 24 (step F201) and a user of the facsimile machine 24 answers (steps F102 to F103), if the user reports an abnormality with the facsimile machine 24 during the subsequent call (steps F104. F204), the maintenance side asks the user to acknowledge a change of an internal functional parameter for communication to correct the abnormality with the facsimile machine 24 and tells the user to press "#" twice (step F205).

When the user presses "#" twice in responding to the request from the maintenance side (step F105). pressing of "#" twice is detected by the panel control part 21. A sound which is allocated for pressing of "#" is then sent to the communication line 1 through the main gate array circuit 23 and the modem 8. Following this, to confirm pressing of "#" twice on the facsimile machine 24, the maintenance side sends a secret identification number of predetermined digits to the communication line 1, in the form of DTMF signal (i.e., tone signal) (step F206).

The DTMF signal which is sent from the maintenance side is supplied to the TEL circuit 5 through the communication line 1 and emitted outside by the handset 6 while at the same time supplied to the cross-point switch 9 through a call transformer T3, and is thereafter gain-adjusted and supplied to the modem 8. The modem 8 converts the received DTMF signal into a code signal such as 1 to 0, * and #. and supplies the code signal to the CPU 16 through a data bus which is formed by the gate array 11 and the main gate array 23. The CPU 16 checks the code signal which is supplied from the modem 8 against a secret identification number which is stored in advance in the RAM 17 (step F108). If there is a match, the CPU 16 switches the relay 3 and connects the communication line 1 with the modem 8 through a transformer T1 (step F107). In the meantime, after switching the relay 7 to thereby connect the handset 6 with the cross-point switch circuit 9 and controlling the cross-point switch circuit 9 to thereby connect the handset 6 with the modem 8, the CPU 16 supplies a data code which is stored in the ROM 15 to the modem 8. The modem 8 performs a voice synthesizing operation in accordance with the data code, so that the handset 6 releases a voice message, such as "Please return a receiver," which demands placing of the handset 6 (step F108).

When the user returns the handset 6 in accordance with the message and placing of the handset 6 is detected (step F109), the CPU 16 supplies the data code which is stored in the ROM 15 to the modem 8 and the modem 8 performs a voice synthesizing operation in accordance with the data code, so that a message, such as "Please enter the secret identification number," which demands entry of the secret identification number is sent to the communication line 1 (step F110).

When the maintenance side sends, in the form of DTMF signal, a secret identification number of predetermined digits for shifting to the maintenance mode (i.e., a remote dialog mode) to the communication line 1 in response to the message which is received from the communication line 1 and which demands the secret identification number (step F207), the DTMF signal is supplied to the modem 8 through the relay 3 and the transformer T1, so that the modem 8 converts the received DTMF signal into a code signal such as 1 to 0, * and #. and supplies the code signal to the CPU 16 through the data bus which is formed by the gate array 11 and the main gate array 23. The CPU 16 checks the code signal which is supplied from the modem 8 against a secret identification number which is stored in advance in the ROM 15 (step F111). If there is a match, the CPU 16 sends a receive sound of 1200 Hz, such as a brief beep, to the communication line 1 to invoke the maintenance mode. If there is not a match, the CPU 16 sends an error sound of 1200 Hz, such as two brief consecutive beeps, to the communication line 1 to open the communication line 1 (step F112), to thereby end the communication.

Hence, in the operation control described above, when the user calls the maintenance side 40 and reports an abnormality with the facsimile machine 24, or when the maintenance side 40 calls the user and confirms whether there is an abnormality or the like with the facsimile machine 24, the maintenance side can perform maintenance of the facsimile machine 24 upon the user's acknowledging maintenance or the like of the facsimile machine 24. Further, third person is prevented from inadvertently performing maintenance since it Is necessary to enter a secret identification number on the maintenance side 40 to invoke the maintenance mode for maintenance.

Next, operations during the maintenance side which is invoked by the operation control above will be described.

First, referring to FIG. 4A, an operation of the user side facsimile machine 24 will be described. At step F121, the DTMF signal which is sent from the maintenance side communication apparatus 40 is received and converted into the code signal. At step F122, the code signal is temporarily stored in the RAM 19.

At step F123, it is judged whether the code signal which is temporarily stored in the RAM 19 is a predetermined signal which demands shifting to a confirmation mode for confirming the functional parameters regarding the facsimile machine 24. For example, whether the code signal is "93#" is judged. At step F124 which follows when it is judged that the code signal is "93#," the values of the functional parameters regarding the facsimile machine 24 are converted into the voice signal. At step F125, the voice signal is sent toward the maintenance side communication apparatus 40.

Upon the operation at step F125, or at step F126 which follows when it is judged at step F123 that the code signal is not "93#," it is judged whether the code signal which is temporarily stored in the RAM 19 is a predetermined signal which demands shifting to a set number receive mode for changing the setting of the functional parameters concerning the facsimile machine 24. e.g.. whether the code signal is "96#" is judged. At step F127 which follows when it is judged that the code signal is "96#," the values of the functional parameters are changed. At step F128, a signal tone which expresses that the change is completed is sent toward the maintenance side communication apparatus 40.

Upon the operation at step F128, or at step F129 which follows when it is judged at step F126 that the code signal is not "96#," it is judged whether the code signal which is temporarily stored in the RAM 19 is a predetermined signal which demands shifting to a list fetching mode which requires fetching and faxing of the functional parameters regarding the facsimile machine 24. For example, whether the code signal is "92#" is judged. If it is judged that the code signal is "92#." the list fetching mode is invoked and the operation is ended.

At step F130 which follows when it is judged at step F129 that the code signal is not "92#," whether a busy tone signal from the maintenance side communication apparatus 40 is detected is judged. If it is judged that the busy tone signal is detected, the sequence proceeds to step F132 to open the communication line and end the operation. At step F131 which follows when it is judged that the busy tone signal is not detected, whether a predetermined period of time has passed is judged. If it is judged that the predetermined period of time has elapsed, the sequence proceeds to step F132. The sequence returns to step F121 when it is determined that the predetermined period of time has not elapsed.

Next, an operation of the maintenance side communication apparatus 40 will be described, with reference to FIG. 4B. At step F221, whether "93#" is entered in order to send the predetermined signal which demands shifting to the confirmation mode is judged. At step F222 which follows when it is judged that there is such an entry, the DTMF signal encoding "93#" is sent toward the facsimile machine 24.

Upon the operation at step F222, or at step F223 which follows when it is judged at step F221 that "93#" is not entered, whether "96#" is entered in order to send the predetermined signal which demands to shift to the set number receive mode is judged. At step F224 which follows when it is judged that there Is such an entry, the DTMF signal encoding "96#" is sent toward the facsimile machine 24.

Upon the operation at step F224, or at step F225 which follows when it is judged at step F223 that "98#" is not entered, whether "92#" is entered in order to send the predetermined signal which demands to shift to list fetching mode is judged. At step F226 which follows when it is judged that there is such an entry, the DTMF signal encoding "92#" is sent toward the facsimile machine 24 and the operation is ended.

At step F227 which follows when it is judged at step F225 that "92#" is not entered, whether an operation for ending the communication is performed is judged. At step F229 which follows when it is judged such an operation is performed, the communication line is opened and the operation is ended.

At step F228 which follows when it is judged at step F227 that the operation for ending the communication is not performed, whether the busy tone signal from the facsimile machine 24 is detected is judged. If it is judged that the busy tone signal is detected, the sequence proceeds to step F229. If it is judged that the busy tone signal is not detected, the sequence returns to step F221.

In short, in the condition where the facsimile machine 24 has entered the maintenance mode, when the maintenance side carries out the operation "93#" (step F221) to invoke the soft switch confirmation mode in which the maintenance side listens to and confirms the values of the functional parameters regarding the facsimile machine 24, the apparatus of the maintenance side sends the DTMF signal encoding "93#" to the communication line 1 (step F222).

When the facsimile machine 24 receives the DTMF signal on the communication line 1, the DTMF signal is supplied to the modem 8 through the relay 3 and the transformer T1, so that the modem 8 converts the received DTMF signal into the code signal such as 1 to 0, * and # (step F121) and supplies the code signal to the CPU 16 through the data bus which is formed by the gate array 11 and the main gate array 23. The CPU 16 stores the code in the temporary storage RAM 19, digit by digit (step F122). In the meantime, when it is determined that the code signal is "93#" (step F123). the CPU 16 provides the modem 8 with the functional parameters which are set by means of the soft switches and stored in the RAM 17, and the modem 8 performs the voice synthesizing operation In accordance with the data code (step F124). whereby the values of the functional parameters are sent as a sound such as a short beep or a continuous beep of 600 Hz, for example (step F125).

That is, as shown in FIG. 2, the first data express whether the self mode function 31 is available, the second data express a detection number 32 of detecting the CNG signals, the third data express whether the cutter function 33 is available, the fourth data express the interval 34 between the CED signal and the NSF signal, and the fifth to the eighth data express the value of the signal sending level 35. In a condition that the first to the eighth data are set and stored as "00001010" as initial setting data for the seventh soft switch SW7 among the functional parameters, when the modem 8 converts such data Into an audible sound, the modem 8 first emits a 4-bit sound consisting of four brief beeps and thereafter emits a 4-bit sound such as long-brief-long-brief beeps in which there is a little space between long beeps and brief beeps.

Hence, in the operation control described above, since it is possible to report the value of a functional parameter which expresses a condition of the apparatus to the maintenance side as an audible sound in response to a request for the functional parameter from the maintenance side, the maintenance side can confirm the condition of the facsimile machine 24 by means of a voice before or after changing the soft switches.

Although a sound of 600 Hz is used as an audible sound for reporting the value of a functional parameter to the maintenance side in this embodiment, this is not limiting. For instance, the value of a functional parameter may be converted Into voice information such as "zero" and "one" and sent. In addition, while the condition of the facsimile machine 24 is confirmed before changing the soft switches in this embodiment, the condition of the facsimile machine 24 may be confirmed by means of a voice after changing the soft switches, to confirm whether maintenance is performed appropriately.

Now, operations for changing the setting of the functional parameters regarding the facsimile machine 24 which are maintained and controlled by the maintenance side will be described.

When the maintenance side confirms the condition of the facsimile machine 24 by means of a voice and judges which data concerning which soft switch are, to be changed through the operation control described above, or when the maintenance side judges which data concerning which soft switch are to be changed in accordance with the contents of a call with a user, in a condition where the facsimile machine 24 has entered the maintenance mode, out of the values of the functional parameters regarding the facsimile machine 24, the maintenance side carries out the operation "96#" for shifting to the set number receive mode for entering the soft switch number 26 of the soft switch which is to be changed, entering the data number 27, entering the changed value and changing the setting of the functional parameter (step F223). and sends the DTMF signal encoding the soft switch number 26 of the soft switch, the data number 27 and "96#" (step F224).

When the facsimile machine 24 receives the DTMF signal on the communication line 1, the DTMF signal is supplied to the modem 8 through the relay 3 and the transformer T1, so that the modem 8 converts the received DTMF signal into the code signal such as 1 to 0, * and # (step F121) and supplies the code signal to the CPU 16 through the data bus which is formed by the gate array 11 and the main gate array 23. The CPU 16 stores the code in the temporary storage RAM 19, digit by digit (step F122). In the meantime, when it is determined that the code signal is "96#" (step F126). from the RAM 17, the CPU 16 reads the functional parameter associated with the soft switch number which is temporarily stored in the RAM 19. Among data regarding the soft switch, the CPU 16 changes data associated with the data number which is temporarily stored in the RAM 19 into the changed value which is also temporarily stored in the RAM 19 (step F127). If the data are correctly changed, as a result of the voice synthesizing operation, the modem 8 sends a sound such as a continuous beep of 600 Hz, for instance, which expresses a fact that the data are normally changed, to the communication line 1 (step F125).

More precisely, in the facsimile machine 24 in which the functional parameters as those shown in the functional parameter chart 25 of FIG. 2 are set, when the maintenance side learns about a condition of the facsimile machine 24 or talks with a user in a telephone conversation and judges that there is a communication trouble, such as the facsimile machine 24 does not respond even though the signal sending level of the facsimile machine 24 is set at the initial set value of −10 dBm (The fifth to the eighth data are set as "1010" for the functional parameter for the seventh soft switch SW7.) due to a of loss in a signal on the communication line from the telephone switchboard to the facsimile machine 24, in order to overcome the communication trouble with the facsimile machine 24, the maintenance side needs to increase the signal sending level up to −6 dB (i.e., to set the fifth to the eighth data are set as "0110" for the functional parameter for the seventh soft switch SW7). To this end, upon invoking the maintenance mode, the maintenance side enters "7*" for designating the soft switch number 26, "5*" for designating the data number 27, "0*" for changing data from 1 to 0, and "98#" which is the command for changing the soft switches, and subsequently sends "7*5*0*96#" to the facsimile machine 24, so that among the functional parameters which are stored in the RAM 17 of the facsimile machine 24, the value of the fifth data for the soft switch SW7 is rewritten from "1" to "0." Following this, the maintenance side enters "7*" for designating the soft switch number 26, "6*" for designating the data number 27, "1*" for changing data from 0 to 1, and and "96#" which is the command for changing the soft switches, and subsequently sends "7*6*1*96#" to the facsimile machine 24, so that among the functional parameters which are stored in the RAM 17 of the facsimile machine 24, the value of the sixth data for the soft switch SW7 is rewritten from "0" to "1." As a result, the signal sending level of the facsimile machine 24 is changed from −10 dB to −6 dB.

Hence, in the operation control described above, since it is possible to change only any desired data among the functional parameters for the apparatus, in accordance with the DTMF signal which is received on the communication line 1, the maintenance side can perform maintenance of the facsimile machine 24 through the communication line 1.

After entering the maintenance mode, when the CPU 16 detects the busy tone which is received on the communication line 1 (step F130). or when the CPU 16 judges that a predetermined period of time has elapsed based on the time which is measured by the timekeeper IC 20 (step F131), the communication line 1 is opened (step F112) to end the communication. On the other hand, when the maintenance side opens the communication line 1 (step F227), or when the CPU 16 detects the busy tone which is received on the communication line 1 (step F228), the communication line 1 is opened (step F229) to end the communication.

Next, a description will be given on operations of fetching data, on a paper, which expresses a condition of the facsimile machine 24 which Is under maintenance where a facsimile transmission function is provided on the maintenance side.

First, referring to FIG. 5A, an operation of the user side facsimile machine 24 will be described. At step F141, the functional parameters regarding the facsimile machine 24 are fetched, and a message indicating the start of facsimile sending of the functional parameters is sent toward the communication apparatus 40 of the maintenance side. At step F142, the CNG signal is sent.

At step F143, whether a predetermined period of time has elapsed is judged. At step F148 which follows when it is judged that the predetermined period of time has elapsed, the communication line is opened to complete the operation. At step F144 which follows when it is judged at step F143 that the predetermined period of time has not elapsed, whether a DIS signal (Digital Identification Signal) from the maintenance side communication apparatus 40 is detected is judged. Upon detection, the sequence proceeds to step F145. When the DIS signal is not detected, the sequence returns to step F143.

At step F145, a DCS signal (Digital Command Signal) is sent toward the maintenance side communication apparatus 40. At step F146, the values of the functional parameters are converted into a facsimile signal and sent toward the maintenance side communication apparatus 40. At step F147, whether sending is completed is judged. When it is judged that sending is completed, the sequence proceeds to step F148. When sending is not completed, the sequence returns to step F146.

Next, referring to FIG. 5E, an operation of the maintenance side communication apparatus 40 will be described. At step F241, the maintenance side communication apparatus 40 is switched into a facsimile receive condition. At step F242, whether a predetermined period of time has elapsed is judged. When it is judged that the predetermined period of time has elapsed, step F249 is executed to open the communication line and end the operation. At step F243 which follows when it is judged that the predetermined period of time has not elapsed, whether the CNG signal from the facsimile machine 24 is detected is judged. At step F244 which follows when it is judged that the CNG signal is detected, the DIS signal is sent toward the facsimile machine 24. When it is judged that the CNG signal is not detected, the sequence returns to step F242.

At step F245 following sending of the DIS signal, whether a predetermined period of time has elapsed is judged. When it is judged that the predetermined period of time has elapsed, the sequence proceeds to step F249. At step F249 which follows when it is judged that the predetermined period of time has not elapsed, whether the DCS signal from the facsimile machine 24 is detected is judged. At step F247 which follows when it is judged that the DCS signal is detected, the facsimile signal is demodulated and printed out on a predetermined recording paper. When it is judged that the DCS signal is not detected, the sequence returns to step F245.

At step F248 following printing out, whether receiving is completed is judged. When it is judged that receiving is completed, the sequence proceeds to step F249. When it is judged that receiving is not completed, the sequence returns to step F247.

In other words, when the maintenance side having the facsimile transmission function wishes to fetch data, on a paper, which expresses a condition of the facsimile machine 24 which is under maintenance, in the condition where the facsimile machine 24 has entered the maintenance mode, the maintenance side execute the operation "92#" for shifting to the list fetching mode which requires the values of the functional parameters to be faxed (step F225), and sends the. DTMF signal encoding "92#" (step F226).

On the other hand, in the facsimile machine 24, upon receipt of the DTMF signal on the communication line 1, the DTMF signal is supplied to the modem 8 through the relay 3 and the transformer T1, so that the modem 8 converts the received DTMF signal into the code signal such as 1 to 0, and # (step F121) and supplies the code signal to the CPU 16 through the data bus which is formed by the gate array 11 and the main gate array 23. The CPU 16 stores the code in the temporary storage RAM 19, digit by digit (step F122). In the meantime, when it is determined that the code signal is "92#" (step F129), the CPU 16 provides the modem 8 with the data codes which are stored in the ROM 15. The modem 8 performs the voice synthesizing operation in accordance with the data code, so that a message, such as "FAX sending" which indicates the start of facsimile sending is sent to the communication line 1 (step F141). The modem 8 thereafter sends the CNG signal to the communication line 1 (step F142).

In the meantime, upon hearing the message reporting the start of facsimile sending which is sent, from the facsimile machine 24, the maintenance side switches the maintenance side apparatus into the facsimile receive condition (step F241), so as to start detecting the CNG which is subsequently received (steps F242 to F243). If the CNG signal which is sent from the facsimile machine is detected before the predetermined period of time elapses, the maintenance side sends the DIS signal to the facsimile machine (step F244).

On the other hand, in the facsimile machine 24, after the CNG signal is sent, before the predetermined period of time elapses (step F143), the modem 8 detects the DIS signal which is received on the communication line 1 (step F144) and sends the DCS signal (step F145). Following this, the CPU 16 provides the modem 8 with the functional parameters which are stored in the RAM 17, and in accordance with the data code, the modem 8 generates the facsimile signal and sends the facsimile signal to the communication line 1 (step F146).

In the meantime, before the predetermined period of time elapses (step F245), when the DCS signal which is sent from the facsimile machine is detected (step F246), the maintenance side receives and demodulates the facsimile signal which Is subsequently received and prints the facsimile signal on a paper such as a thermosensitive paper (step F247).

In the facsimile machine 24, upon sending the facsimile signal (step F147), the communication line 1 is opened (step F148) to end the communication. On the maintenance side, as sending of the facsimile signal from the facsimile machine 24 is stopped, judging that receiving of the facsimile signal is completed (step F248), the communication line 1 is opened (step F249) to end the communication.

Thus, since the maintenance side 40 can print out, on a paper, the functional parameters regarding the facsimile machine 24 which is under maintenance, the maintenance side 40 can confirm a condition of the facsimile machine 24 before or after changing the soft switches.

Although the preferred embodiments above require that after invoking the list fetching mode, a communication is automatically ended after the functional parameters regarding the facsimile machine are sent as the facsimile signal. This is not limiting. Rather, after invoking the list fetching mode, the maintenance mode may be invoked after the functional parameters regarding the facsimile machine are sent as the facsimile, for example. When the maintenance mode is invoked in such a manner, since it is not possible to conduct a regular telephone conversation and facsimile transmission, the LCD or the like displays that the maintenance mode is active while the handset 6 outputs a message or a busy tone which indicates that the maintenance mode is active.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus for data communication over a communication channel based on technical communication parameters, the communication apparatus comprising:

detecting means for detecting a dual tone signal received through the communication channel for a maintenance mode separately establishable from a facsimile transmission mode, the dual tone signal representing at least a facsimile signaling setting of a particular one of the technical communication parameters for supporting traffic on the communications channel;

controlling means for controlling at least the facsimile signaling setting of the particular one of the communication parameters in accordance with a detection result obtained by the detecting means after a set-up time period of the maintenance mode primarily dependent upon determining whether a detected secret identification number represented by the dual tone signal matches a stored identification number; and     a monitor for monitoring the controlling means and the facsimile signaling setting of the particular one of the communication parameters during the maintenance mode to transmit a corresponding status message associated with the facsimile signaling setting over the communications channel.

2. The communication apparatus of claim 1, further comprising storing means for storing a predetermined secret identification number accessible by the controlling means, wherein when the detected secret identification number represented by the dual tone modulation, detected by the detecting means, matches the predetermined secret identification number stored in the storing means, the controlling means changes the setting or settings of communication in accordance with detection result obtained by the detecting means.

3. The communication apparatus of claim 2, further comprising operating means for allowing entry of the detected secret identification number for detection by the detecting means, wherein     when entry of the detected secret identification number is allowed by the operating means, the controlling means judges whether the detected secret identification number included in the dual tone signal matches the predetermined secret identification number stored in the storing means or not.

4. The communication apparatus of any one of claims 1 to 3, further comprising voice guidance sending means for sending a voice guidance expressing an operational sequence, for changing the setting or settings of the communication parameters.

5. A communication apparatus for data communication based on technical communication parameters, the communication apparatus comprising:

detecting means for detecting a dual tone modulation frequency signal received through a communication line, the dual tone modulation frequency signal including data controlling facsimile signaling values of the technical communication parameters for supporting communications traffic;

controlling means for controlling the facsimile signaling values in accordance with a detection result obtained by the detecting means after a set-up time period of a maintenance mode primarily dependent upon determining whether a detected secret identification number represented by the dual tone signal matches a stored identification number; and     a monitor for monitoring the facsimile signaling value of a particular one of the technical communication parameters during a maintenance mode to transmit a corresponding voice message associated with the facsimile signaling value over the communications channel.

6. The communication apparatus of claim 3 further comprising voice guidance sending means for sending voice guidance signals expressing an operational sequence for judging of the secret identification numbers by the controlling means.

7. The communication apparatus according to claim 1 wherein the communication parameters are selected from the group consisting of a detection number of a calling tone, an interval between a called station identification signal and a non-standard facilities signal, a signal sending level, a self-mode function status, and a cutter function status.

8. The communication apparatus according to claim 1 further comprising:

a remote maintenance unit in communication with the detecting means; and transmission means for transmitting at least one status message to the remote maintenance unit for confirmation of the status to a user at the remote maintenance unit.

9. The communications apparatus according to claim 1 wherein said converter means comprises a modem accepting a data code provided by the controlling means; and wherein, based upon the data code, the modem generates a synthesized voice signal as the status message to confirm whether or not the setting was changed by the controlling means.

10. The communications apparatus according to claim 1 wherein said converter means comprises a modem accepting a data code provided by the controlling means; and wherein, based upon the data code, the modem generating a modulated tone as the status message to confirm whether or not the setting was changed by the controlling means.

11. A communication apparatus for communication over a communication channel, the communications apparatus comprising:

a memory for storing an initial facsimile signaling setting of a technical communication parameter of the communications apparatus;

an input adapted to receive communication from the communication channel;

a detector for detecting a tone modulated signal at the input, the tone modulated signal capable of representing a desired facsimile signaling setting of the technical communication parameter underlying traffic on the communications channel after a set-up time period of the maintenance mode primarily dependent upon determining whether a detected secret identification number represented by the dual tone signal matches a stored identification number;

an output adapted to transmit over the communications channel;

a processor in communication with the memory for updating the memory, the processor adapted to store the desired facsimile signaling setting in the memory after detecting the tone modulated signal in the detector; and a converter arranged to receive at least one of said facsimile signaling settings as controlled by the processor and arranged to encode a status message at the output, the status message being indicative of whether the initial facsimile signaling setting or the desired facsimile signaling setting represents a present status of the technical communication parameter during a maintenance mode.

12. The communication apparatus according to claim 11 wherein the converter comprises a voice synthesizer adapted to provide a synthesized voice message confirming that a change from the initial setting to the desired setting has occurred.

13. The communication apparatus according to claim 11 wherein the converter comprises a tone modulator adapted to provide an audible tone message confirming that a change from the initial setting to the desired setting has occurred.

14. The communication apparatus according to claim 11 further comprising:

a remote maintenance unit transmitting a first identification number over the communications channel to the detector;

comparing means for comparing the first identification number transmitted to the detector to a second identification number stored in the memory, the comparing means yielding a result indicating whether or not the first identification number coincides with the second identification number; and communication termination means for terminating communication over the communications channel if the result indicates that the first identification number does not coincide with the second identification number to prevent unauthorized access of the communications apparatus.

15. The communications apparatus according to claim 14 wherein the remote maintenance apparatus comprises a telephone equipped with a dual tone multiple frequency encoder.

16. The communication apparatus according to claim 11 wherein the communication parameter is selected from the group consisting of a detection number of a calling tone, an interval between a called station identification signal and a non-standard facilities signal, a signal sending level, a self-mode function status, and a cutter function status.

* * * * *